United States Patent
Suzuki

(10) Patent No.: US 9,574,876 B2
(45) Date of Patent: Feb. 21, 2017

(54) ANGLE DETECTOR

(71) Applicant: DENSO CORPORATION, Kariya, Aichi-pref. (JP)

(72) Inventor: Takahito Suzuki, Kariya (JP)

(73) Assignee: DENSO CORPORATION, Kariya (JP)

(*) Notice: Subject to any disclaimer, the term of this patent is extended or adjusted under 35 U.S.C. 154(b) by 733 days.

(21) Appl. No.: 13/716,601

(22) Filed: Dec. 17, 2012

(65) Prior Publication Data

US 2013/0158945 A1   Jun. 20, 2013

(30) Foreign Application Priority Data

Dec. 16, 2011  (JP) ................................ 2011-275596
Dec. 27, 2011  (JP) ................................ 2011-285632
May 21, 2012  (JP) ................................ 2012-115972

(51) Int. Cl.
  *G01C 9/00*  (2006.01)
  *G01C 1/00*  (2006.01)
  *G01D 5/14*  (2006.01)

(52) U.S. Cl.
  CPC .. *G01C 1/00* (2013.01); *G01D 5/14* (2013.01)

(58) Field of Classification Search
  CPC ................................. G01C 1/00; G01D 5/14
  USPC ....... 702/151, 147, 150; 307/9.1; 310/12.27, 310/68 B, 67 R; 701/61, 41; 318/811, 799
  See application file for complete search history.

(56) References Cited

U.S. PATENT DOCUMENTS

| | | |
|---|---|---|
| 5,438,909 A | 8/1995 | Menard |
| 2004/0222754 A1* | 11/2004 | Ochiai et al. ................. 318/105 |
| 2006/0016427 A1* | 1/2006 | Uda ..................... F02D 9/1095 123/399 |
| 2006/0176473 A1* | 8/2006 | Yasutomi ................ G01C 1/00 356/141.3 |
| 2009/0091093 A1* | 4/2009 | Urababa et al. ........... 280/5.511 |
| 2010/0033064 A1* | 2/2010 | Tanaka et al. .............. 310/67 R |
| 2011/0262112 A1* | 10/2011 | Tanaka ..................... G01P 3/48 388/811 |
| 2012/0112713 A1* | 5/2012 | Kuehn .......................... 323/207 |
| 2012/0221208 A1* | 8/2012 | Kojo et al. ...................... 701/41 |
| 2013/0144553 A1* | 6/2013 | Omata .................. G01D 5/245 702/151 |

(Continued)

FOREIGN PATENT DOCUMENTS

| | | |
|---|---|---|
| JP | 61-30991 | 2/1986 |
| JP | 63-011086 | 1/1988 |

(Continued)

OTHER PUBLICATIONS

Office Action (1 page) dated Mar. 11, 2014, issued in corresponding Japanese Application No. 2012-241338 and English translation (1 page).

(Continued)

*Primary Examiner* — Gregory J Toatley
*Assistant Examiner* — Eman Alkafawi
(74) *Attorney, Agent, or Firm* — Nixon & Vanderhye PC

(57) ABSTRACT

An angle detector detects an operation angle of an electric actuator having an electric motor. The electric motor generates rotation force when being energized. The angle detector includes a controller. The controller calculates an average current flowing through the electric motor during operation of the electric actuator. The controller calculates the operation angle of the electric actuator from a predetermined formula by using the average current.

15 Claims, 9 Drawing Sheets

(56) References Cited

U.S. PATENT DOCUMENTS

2014/0343776 A1* 11/2014 Ang et al. .................... 701/22

FOREIGN PATENT DOCUMENTS

| JP | 2002-315348 | 10/2002 |
|----|-------------|---------|
| JP | 2010-93904  | 4/2010  |

OTHER PUBLICATIONS

Office Action (2 pages) dated Mar. 4, 2014, issued in corresponding Japanese Application No. 2011-285632 and English translation (2 pages).
Office Action (2 pgs.) dated Oct. 29, 2013 issued in corresponding Japanese Application No. 2011-285632 with an at least partial English-language translation thereof (1 pg.).
Office Action (6 pages) dated Nov. 24, 2014, issued in corresponding Chinese Application No. 2012 1054 4521.4 and English translation (7 pages).

* cited by examiner

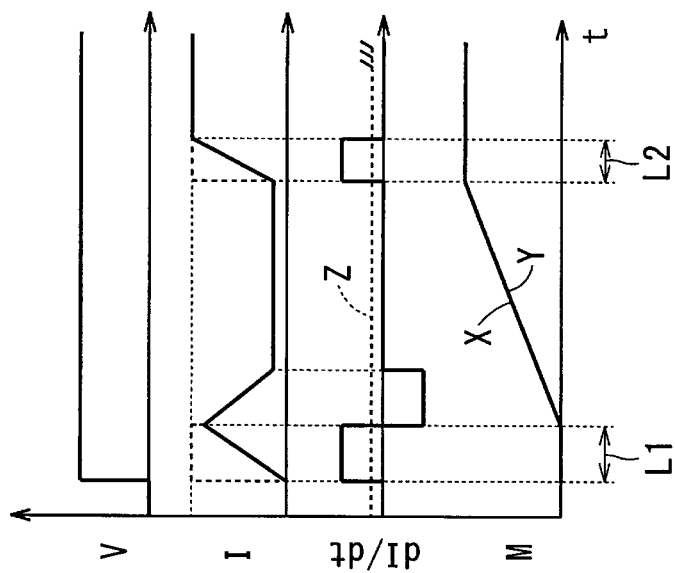
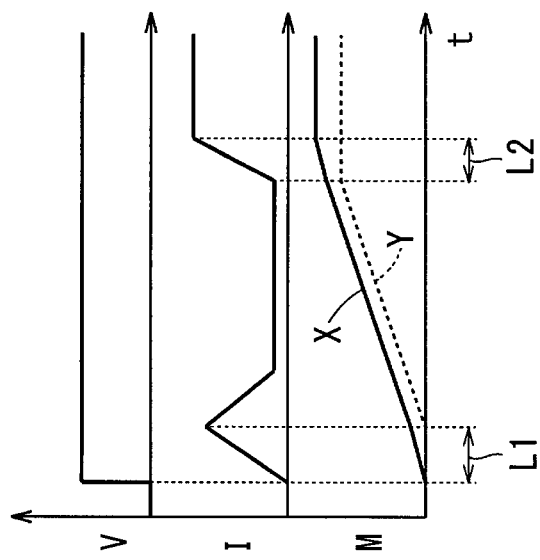

ANGLE DETECTOR

CROSS REFERENCE TO RELATED APPLICATION

This application is based on Japanese Patent Application No. 2011-275596 filed on Dec. 16, 2011, No. 2011-285632 filed on Dec. 27, 2011, and No. 2012-115972 filed on May 21, 2012, the contents of which are incorporated herein by reference.

FIELD

The present disclosure relates to angle detectors for detecting an operation angle of an electric actuator, and in particular relates to an angle detector for detecting the operation angle without a rotation angle sensor.

BACKGROUND

Prior Art

JP-A-S63-11086 discloses an angle detection technique without a rotation angel sensor. In the technique, a position X of a target moved by a direct-current (DC) motor is calculated from the following formula [B]:

$$X = (N0/Is) \int (Is - I) dt \quad [B]$$

In the formula [B], Is represents a locked-rotor current of the DC motor, N0 represents a maximum rotational number (maximum rotational speed) of the DC motor under no load condition, and I represents a current flowing through the DC motor at the present time. As shown in FIG. 4A, the locked-rotor current Is is a current of the DC motor when a rotor of the DC motor does not turn so that a rotational number N of the DC motor can be zero.

Problem of Prior Art

According to the above conventional technique, the locked-rotor current Is and the maximum rotational number N0 are learned and updated.

It is noted that the maximum rotational number N0 is calculated based on the locked-rotor current Is. Therefore each of the two learned values (i.e., Is and N0) depends on the locked-rotor current Is.

As described above, the formula [B] used in the conventional technique depends heavily on the locked-rotor current Is. Therefore, if the locked-rotor current Is has an error, the error is reflected in the formula [B] so that the position X of the target cannot be accurately detected.

In particular, when the DC motor is a brushed DC motor, the locked-rotor current Is varies depending on a positional relationship between a brush and a commutator. Therefore, the locked-rotor current Is in the formula [B] may vary largely depending on the position of the brush.

For example, when the brushed DC motor has three slots, there are two cases. In the first case, the brush is in contact with two commutators. In the second case, the brush is in contact with only one commutator. The locked-rotor current Is is about 1.33 times larger in the first case than in the second case. Therefore, the position X calculated from the formula [B] can vary largely between in the first case and in the second case.

SUMMARY

In view of the above, it is an object of the present disclosure to provide a sensorless angle detector for detecting an operation angle by using an equation that less depends on a locked-rotor current.

According to an aspect of the present disclosure, an angle detector is configured to detect an operation angle of an electric actuator having an electric motor. The angle detector includes a controller that calculates an average current flowing through the motor during operation of the actuator. The controller calculates the operation angle of the actuator from a predetermined formula by using the average current.

According to another aspect of the present disclosure, an angle detector is configured to detect an operation amount based on a motor current flowing through an electric motor. The operation amount indicates at least one of an amount of operation of the motor, an amount of operation of an electric actuator having the electric motor, and an amount of operation of a target driven by the actuator. The angle detector includes a controller that detects a change in an inrush current from an increase to a decrease. The controller calculates the operation amount based on the motor current after the change in the inrush current from the increase to the decrease is detected.

BRIEF DESCRIPTION OF THE DRAWINGS

The above and other objects, features, and advantages will become more apparent from the following description and drawings in which like reference numerals depict like elements. In the drawings:

FIG. 6A is a timing chart according to a comparison example, and FIG. 6B is a timing chart according to a second embodiment of the present disclosure;

DETAILED DESCRIPTION

Figure 1A:
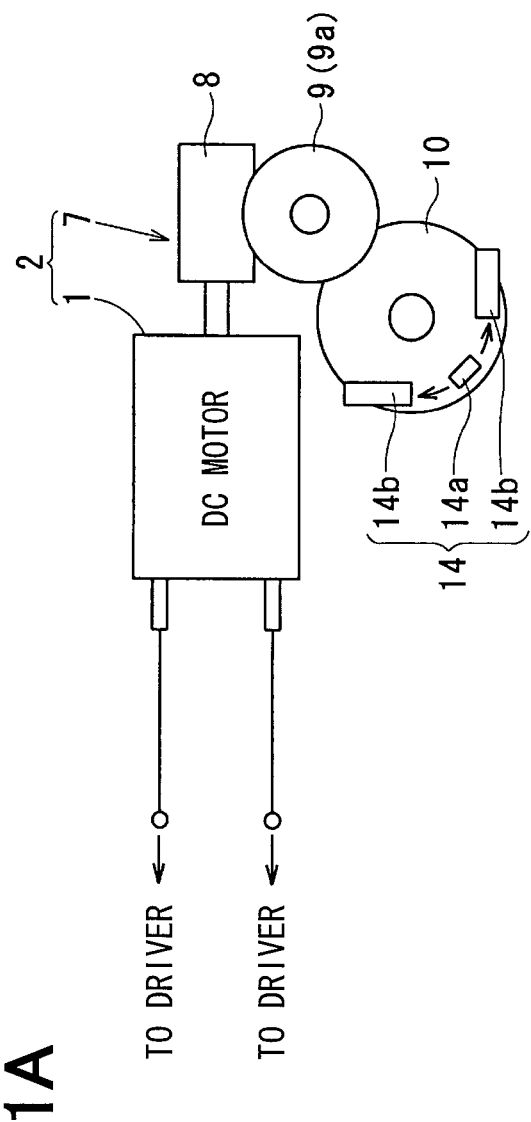
FIG. 1A is a diagram illustrating an electric actuator.

Embodiments of the present disclosure are described below with reference to the drawings. According to the embodiments, an angle detector detects an operation angle $\theta a$ of an electric actuator 2 having an electric motor 1. The electric motor 1 generates rotation force when being energized. The operation angle $\theta a$ is calculated from a formula [A] below.

$$\theta a = \{(Ia - Is)/(Ia1 - Is)\} \cdot \theta \quad [A]$$

θ represents a rotation range of the electric actuator 2. The rotation range θ is determined by mechanical rotation limitation of the electric actuator 2. Ia1 represents an average of a motor current I flowing through the electric motor 1 during a total energization time T1 when the electric actuator 2 is operated from one end to the other end of the rotation range θ. Is represents a rotor-locked current of the electric motor 1 when the electric motor 1 cannot mechanically rotate. Ia represents an average of the motor current I when the operation angle θa is measured.

The rotation range θ is predetermined. That is, the rotation angle is a known value. In contrast, the average motor current Ia1 and the rotor-locked current Is are measured by operating the electric actuator 2 from one end to the other end of the rotation range θ, when an initial setting (i.e., initial learning) of the angle detector is performed. The predetermined rotation range θ, the measured average motor current Ia1, and the measured rotor-locked current Is are substituted into the formula [A] so that the formula [A] can be learned and set. Thus, the operation angle θa can be measured by measuring the average motor current Ia and by substituting the measured average motor current Ia into the formula [A].

First Embodiment

A first embodiment of the present disclosure is described below with reference to FIGS. 1A-5B. According to the first embodiment, the angle detector is applied to a tumble control valve (TCV).

(Explanation of TCV)

The TCV includes the electric actuator 2, a valve 3, a shaft 5, and an electric control unit (ECU) 6. The value 3 is located in an intake passage (e.g., intake manifold) near a cylinder of an engine. The shaft 5 is rotatably supported through a bearing 4 and rotates with the valve 3. The electric actuator 2 drives the shaft 5 so that the valve 3 can be driven. The ECU 6 energizes and controls the electric actuator 2.

According to the first embodiment, the valve 3 is driven to move between two positions: fully opened position and fully closed position. It is noted that the position of the valve 3 is not limited to the two positions. When the valve 3 is in the fully opened position, the intake passage is fully opened. When the valve 3 is in the fully closed position, the intake passage is fully closed. However, it is not always essential that even when the valve 3 is in the fully closed position, the intake passage is fully closed. For example, when the valve 3 is in the fully closed position, the intake passage may be almost fully closed.

The electric actuator 2 includes the electric motor 1 and a gear reducer 7. The gear reducer 7 drives the shaft 5 by decelerating the rotation speed (i.e., by increasing the torque) of the electric motor 1.

The electric motor 1 is a typical brushed DC motor. When a direction of energization to the electric motor 1 changes, a rotation direction of the electric motor 1 changes. The electric motor 1 produces a rotary torque depending on the amount of energization to the electric motor 1.

The gear reducer 7 is a combination of multiple gears. The gear reducer 7 transfers the rotary torque produced by the electric motor 1 to the shaft 5 by reducing the rotation speed of the electric motor 1. Specifically, the gear reducer 7 includes a motor gear 8, an intermediate gear 9, and a final gear (i.e., output rotor) 10. The motor gear 8 rotates with the electric motor 1. The intermediate gear 9 rotates with the motor gear 8. The final gear 10 rotates with intermediate gear 9. The final gear 10 is fixed to an end of the shaft 5 so that the shaft 5 can rotate with the final gear 10.

Figure 2A:
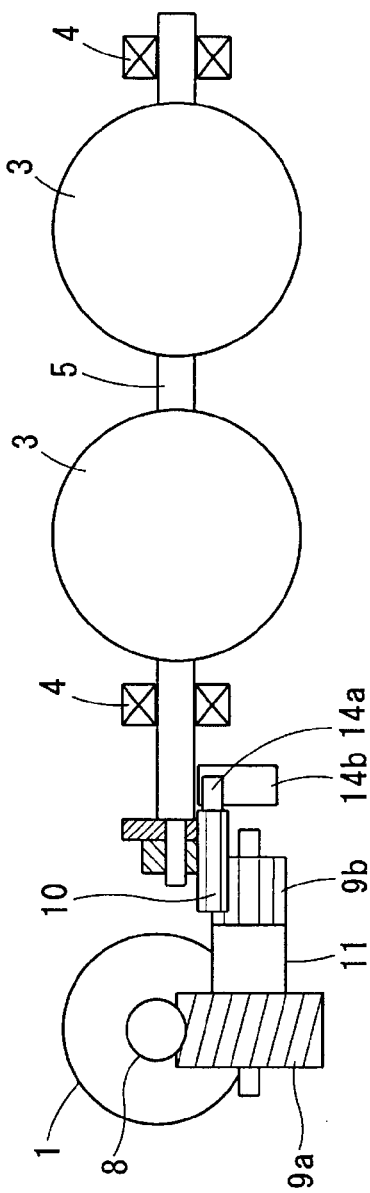
FIG. 2A is a diagram illustrating a detailed view of the electric actuator and an electric control unit.
Figure 2B:
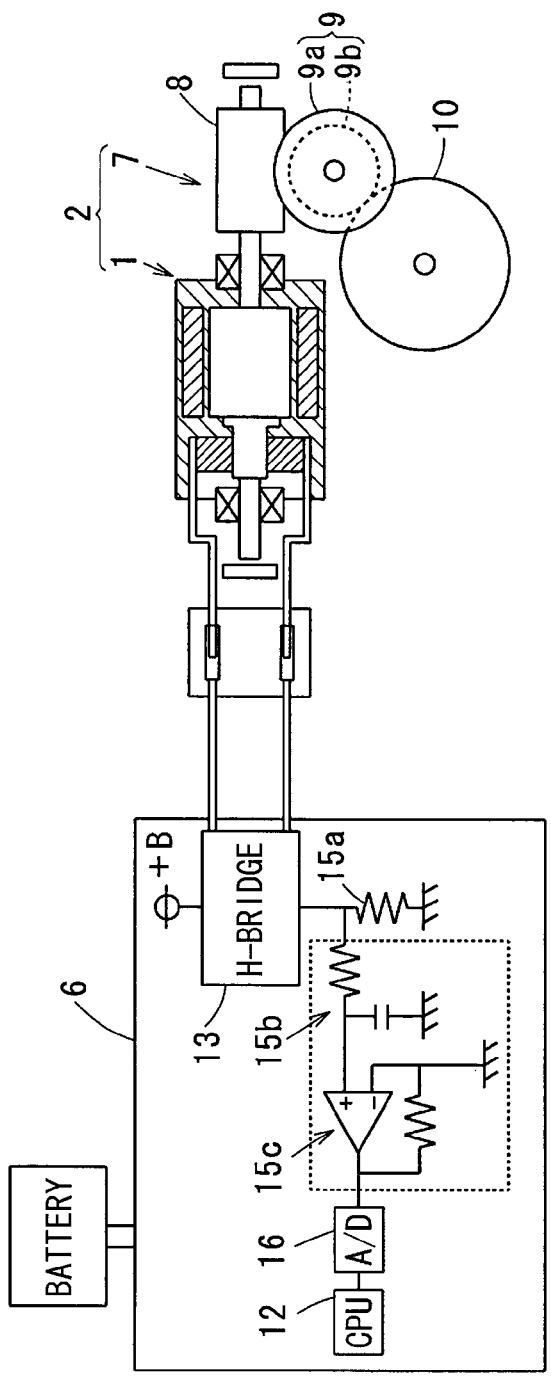
FIG. 2B is a diagram illustrating a tumble control valve.

The motor gear 8 is a small-diameter worm gear. The motor gear 8 is fixed to a rotor shaft of the electric motor 1. The intermediate gear 9 is a double gear and rotatably supported by a supporting shaft fixed to a fixing member (e.g., intake manifold). The intermediate gear 9 has a large-diameter helical gear 9a and a small-diameter spur gear 9b. The small-diameter spur gear 9b is coaxially arranged with the large-diameter helical gear 9a. The helical gear 9a continuously meshes with the motor gear 8, and the spur gear 9b continuously meshes with the final gear 10. As shown in FIG. 2B, a vibration absorption cushion 11 such as a rubber cushion is interposed between the helical gear 9a and the spur gear 9b.

The final gear 10 is a large-diameter gear and fixed to the end of the shaft 5. The rotary torque is increased while being transmitted through the motor gear 8, the helical gear 9a, the spur gear 9b, and the final gear 10. The final gear 10 applies the increased torque to the shaft 5. For example, the final gear 10 can have outer teeth, which mesh with the spur gear 9b, only within an area corresponding to rotation of the shaft 5 (i.e., valve 3).

The ECU 6, which controls the electric actuator 2, has a central processing unit (CPU) 12. The ECU 6 calculates an opening degree (i.e., fully-opened position or fully-closed position in this embodiment) of the valve 3 based on an operating condition of the engine. Then, the ECU 6 energizes and controls the electric motor 1 through a driver circuit 13 (e.g., H-bridge circuit) so that the valve 3 can be opened to the calculated opening degree.

The ECU 6 has a failure detection section for detecting a failure in the TCV.

In the conventional technique, a rotation angle sensor for detecting a rotation angle of the shaft 5 is used to detect a failure in the TCV. Specifically, the rotation angle sensor is a magnet sensor and detects a relative rotation between two rotating members in a contactless manner. The rotation angle sensor includes a magnetic circuit and a Hall IC. The magnetic sensor is inserted in the final gear 10. The Hall IC is fixed to a fixing member (e.g., a cover attached to the intake manifold) and located inside and spaced from the magnetic circuit. The ECU 6 detects the rotation angle of the shaft 5 (i.e., valve 3) based on an output signal of the Hall IC.

One disadvantage of the conventional technique is that the rotation angle sensor is useless unless a failure occurs in the TCV. Therefore, cost performance of the rotation angle sensor is low.

To overcome the above disadvantage, according to the first embodiment, the failure in the TCV is detected without a rotation angle sensor.

The angle detector according to the first embodiment is described in detail below.

The ECU 6 has an angle detection program for detecting the operation angle θa of the electric actuator 2 (i.e., rotation angle of the shaft 5). For example, the angle detection program can be stored in a memory device such as a read only memory (ROM). The angle detection program estimates the operation angle θa of the electric actuator 2 from the motor current flowing through the electric motor 1 based on a proportional relationship between the motor current and the number of rotations of the electric motor 1. Specifically, the angle detection program calculates the operation angle θa from the following formula [A].

$$\theta a = \{(Ia-Is)/(Ia1-Is)\} \cdot \theta \qquad [A]$$

As mentioned previously, θ represents the rotation range of the electric actuator 2 determined by the mechanical rotation limitation of the electric actuator 2. Ia1 represents the average of the motor current I flowing through the electric motor 1 during the total energization time T1 when the electric actuator 2 is operated from one end to the other end of the rotation range θ. Is represents the rotor-locked current flowing through the electric motor 1 when the electric motor 1 cannot mechanically rotate. Ia represents the average of the motor current I flowing through the electric motor 1 when the operation angle θa is measured.

As mentioned previously, the average motor current Ia1 and the rotor-locked current Is are measured by operating the electric actuator 2 from one end to the other end of the rotation range θ in the initial setting (i.e., initial learning) of the angle detector. Then, the measured average motor current Ia1, the measured rotor-locked current Is, and the predetermined rotation range θ are substituted in the equation [A] so that the formula [A] can be learned and set a. Thus, the operation angle θa can be measured by measuring the average motor current Ia and by substituting the measured average motor current Ia into the formula [A].

According to the first embodiment, the electric actuator 2 has a mechanical stopper 14 for providing the mechanical rotation limitation of the electric actuator 2. As shown in FIG. 1A, the mechanical stopper 14 is attached to the final gear 10 of the gear reducer 7. The mechanical stopper 14 includes a stopper projection (i.e., stopper lever) 14a and two fixed stoppers 14b. The stopper projection 14a is attached to the final gear 10. The fixed stoppers 14b are fixed to a fixing member (e.g., intake manifold) and limit a rotation range of the final gear 10 to between the fully-opened position and the fully-closed position of the valve 3 (i.e., between one end to the other end of the rotation range θ of the electric actuator 2).

Figure 1B:
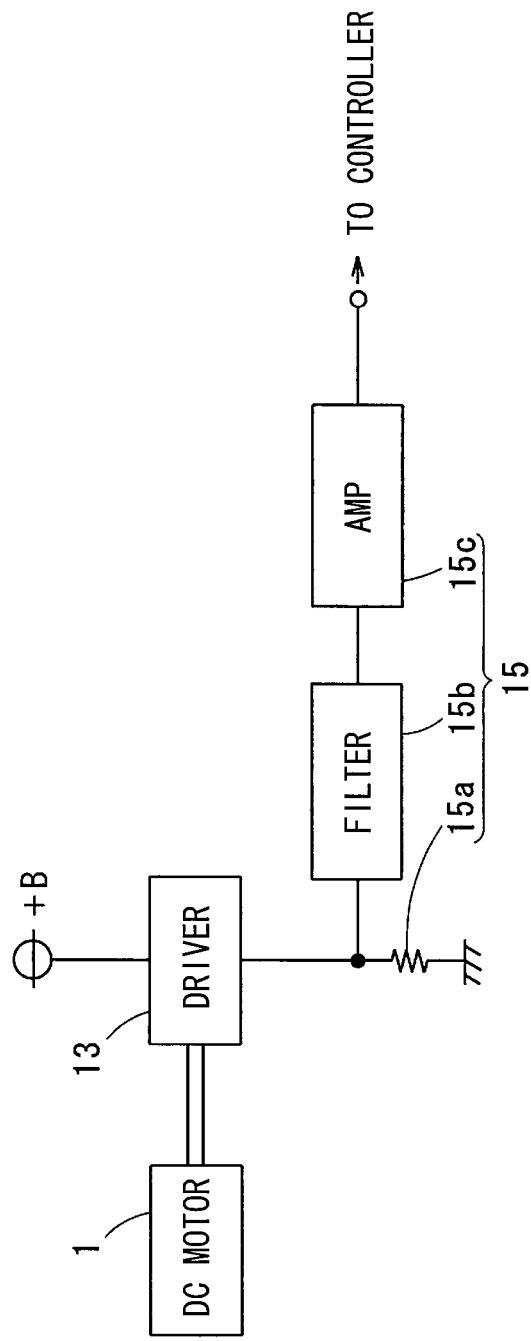
FIG. 1B is a block diagram of an angle detector according to a first embodiment of the present disclosure.

As shown in FIG. 1B, the driver circuit 13 of the electric motor 1 is connected to a current sensor 15 for detecting a current flowing through the electric motor 1. According to the first embodiment, the current sensor 15 includes a shunt resistor 15a, a filter circuit 15b, and an amplifier circuit 15c. The shunt resistor 15a is connected between the driver circuit 13 and a ground potential. The filter circuit 15b removes noise from a voltage signal detected by the shunt resistor 15a. The amplifier circuit 15c amplifies an output signal of the filter circuit 15b. An output signal of the amplifier circuit 15c is converted to a digital signal by an A/D converter 16 of the ECU 6. The digital signal is read by the CPU 12.

The above formula [A] is explained in detail below with reference to FIG. 3 and FIG. 4B. The explanation is based on the following definitions. It is noted that some definitions have been already described.

I represents the motor current flowing through the electric motor 1. T represents an output torque of the electric motor 1. N represents the motor rotation number (i.e., rotation speed) of the electric motor 1. θm represents a rotation angle of the electric motor 1. θa represents the operation angle of the electric actuator 2. r represents a reduction ratio of the gear reducer 7. t represents an operation time Δt represents a sampling interval. In represents the motor current I sampled at the sampling interval Δt. Δθn represents the operation angle θa sampled at the sampling interval Δt. Ia represents the average of the motor current I when the operation angle θa is measured. T1 represents the total energization time when the electric actuator 2 is operated from one end to the other end of the rotation range θ in the initial setting of the angle detector. Ia1 represents the average of the motor current I during the total energization time T1. Na represents the average of the motor rotation number N during the total energization time T1. θ represents the rotation range of the electric actuator 2 limited by the mechanical stopper 14. Is represents the rotor-locked current flowing through the electric motor 1 when the electric motor 1 cannot rotate due to the mechanical stopper 14 (i.e., due to contact between the stopper projection 14a and the fixing stopper 14b). Each of α, β, γ, δ, k, and g is a constant value.

(Method for Calculating the Operation Angle θa from the Motor Current I)

From I-T characteristic of the electric motor 1, the motor current I is given by the following equation (1):

$$I = \alpha \cdot T + \beta \quad (1)$$

From N-T characteristic of the electric motor 1, the motor rotation number N is given by the following equation (2):

$$N = \gamma \cdot T + \delta \quad (2)$$

Form the equations (1) and (2), the motor rotation number N is given by the following equation (3):

$$N = k \cdot I + g \quad (3)$$

In the above equation (3), $k = \gamma/\alpha$, and $g = \delta - \{\gamma \cdot (\beta/\alpha)\}$ The motor rotation angle θm is given by the following equation (4):

$$\theta m = N \cdot t \quad (4)$$

The operation angle θa is given by the following equation (5):

$$\theta a = \theta m / r \quad (5)$$

From the above equations (3), (4), and (5), the operation angle θa is given by the following equation (6):

$$\theta a = (k \cdot I + g) \cdot (t/r) \quad (6)$$

(In a case where the motor current I varies)

As mentioned previously, In represents the motor current I sampled at the sampling interval Δt during the total energization time T1, and Δθn represents the operation angle θa sampled at the sampling interval Δt. From the equation (6), the operation angle θa is given by the following equation (7):

$$\theta a = \Sigma \theta n = \Sigma \{(k \cdot In + g) \cdot (\Delta t/r)\} = (k \Sigma In + g \cdot n) \cdot (\Delta t/r) \quad (7)$$

The following equation (8) is given by defining the average of the sampled motor current In as Ia:

$$\Sigma In = n \cdot Ia \quad (8)$$

From the equations (7) and (8), and the relationship "T1 = n·Δt", the operation angle θa can be given by the following equation (9):

$$\theta a = (k \cdot Ia + g) \cdot (T1/r) \quad (9)$$

(Method of Correcting Motor Characteristics)

Figure 4A:
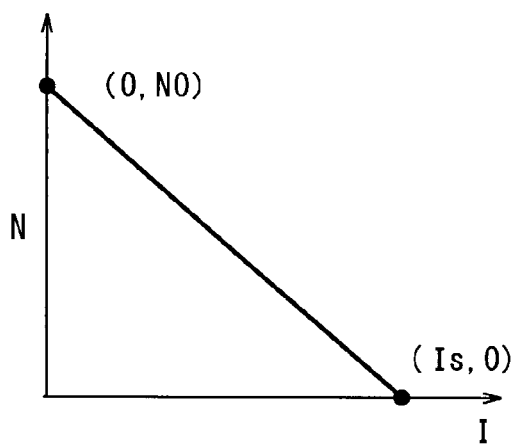
FIG. 4A is a diagram illustrating a I-N characteristic according to a prior art.
Figure 4B:
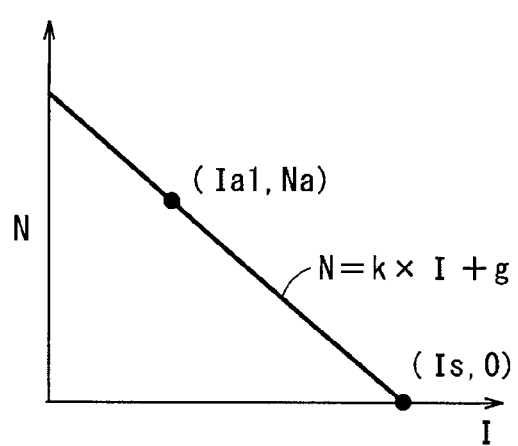
FIG. 4B is a diagram illustrating a I-N characteristic according to the first embodiment.

Here, it is assumed that actual motor characteristics (i.e., relationship between the motor current I and the motor rotation number N, such as shown in FIG. 4B) satisfy the following equation (10):

$$N = k \cdot I + g \quad (10)$$

The average motor rotation number Na, which is the average of the motor rotation number N during the total energization period T1 where the operation range of the electric actuator 2 is limited to the rotation range θ, is given by the following equation (11):

$$Na = \theta \cdot (r/T1) \quad (11)$$

As mentioned previously, Ia1 represents the average of the motor current I sampled at the sampling interval Δt during the total energization period T1. The following equation (12) is given from the equations (10) and (11) by using the average motor current Ia1:

$$\theta \cdot (r/T1) = k \cdot Ia1 + g \qquad (12)$$

When the motor current I is equal to the locked-rotor current Is, the motor rotation number N is zero. Therefore, the following equation (13) is satisfied:

$$0 = k \cdot Is + g \qquad (13)$$

From the above equations (12) and (13), the following equations (14) and (15) are satisfied:

$$K = (\theta \cdot r)/\{T1 \cdot (Ia1 - Is)\} \qquad (14)$$

$$g = (-\theta \cdot r \cdot Is)/\{T1 \cdot (Ia1 - Is)\} \qquad (15)$$

The formula [A] is obtained by substituting the equations (14) and (15) into the equation (9):

$$\theta a = \{(Ia - Is)/(Ia1 - Is)\} \cdot \theta \qquad [A]$$

(Initial Learning of the Angle Detector)

Figure 5A:
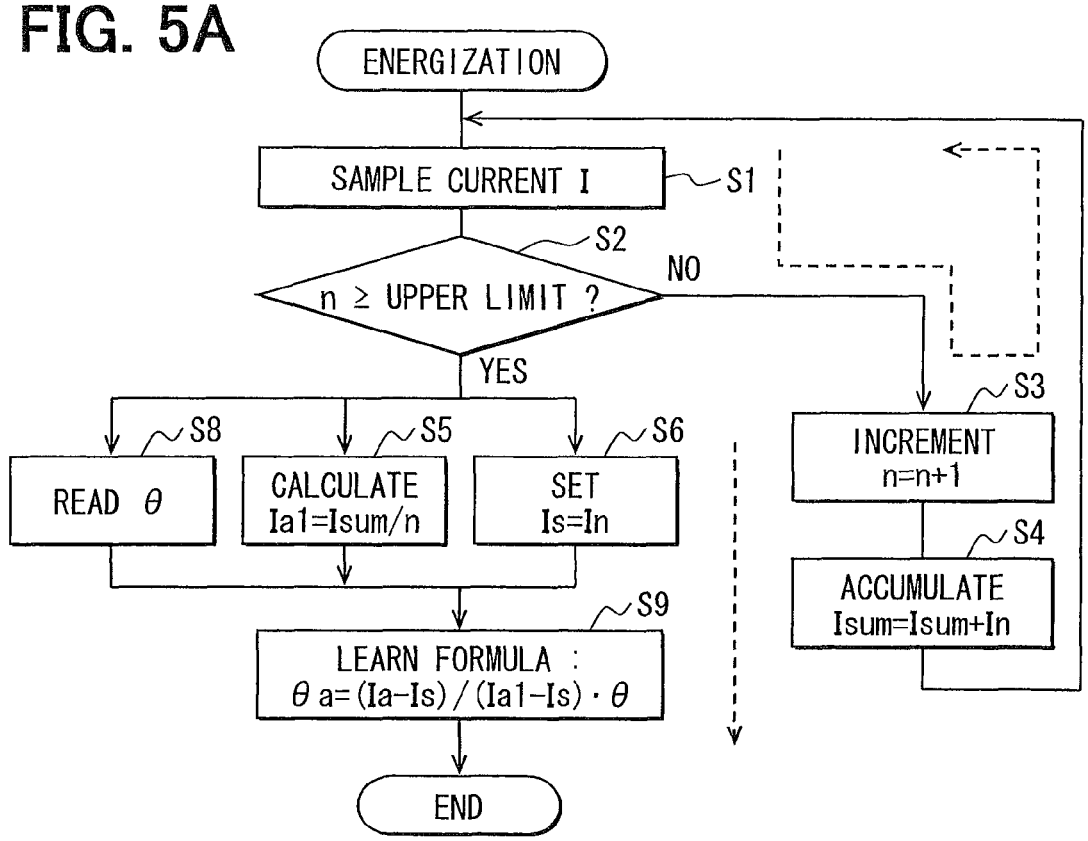
FIG. 5A is a flow chart of an initial learning process according to the first embodiment.

An initial learning process (i.e., initial setting process) for learning and setting the formula [A] is described below with reference to. FIG. 5A.

When the electric actuator 2 is connected to the ECU 6, the electric motor 1 is energized, and the ECU 6 performs the learning process in accordance with the angle detection program. The learning process starts at S1, where the ECU 6 obtains the sampled motor current In by sampling the motor current I. Then, the learning process proceeds to S2, where the ECU 6 determines whether a counter value n reaches a predetermined upper limit equivalent to the total energization time T1.

If the counter value n does not reach the upper limit corresponding to NO at S2, the learning process proceeds to S3. At S3, the ECU 6 increments the counter value n by one. Then, the learning process proceeds to S4, where the ECU 6 calculates a total sampled current Isum by accumulating the sampled motor current In Then, the learning process returns to S1.

In contrast, if the counter value n reaches the upper limit corresponding to YES at S2, the learning process proceeds to S5, S6, and S8. At S5, the ECU 6 calculates the average motor current Ia1 by dividing the total sampled current Isum by the counter value n. At S6, the ECU 6 determines the rotor-locked current Is by measuring the sampled motor current In when the stopper projection 14a comes into contact with the fixing stopper 14b so that the electric actuator 2 cannot rotate. Specifically, when the sampled motor current In exceeds a predetermined threshold value, the ECU 6 determines that the rotor-locked current Is is the sampled motor current In. At S8, the ECU 6 reads the predetermined rotation range θ from a memory device or the like.

After S5, S6, and S8, the learning process proceeds to S9, where the ECU 6 substitutes the average motor current Ia1, the rotor-locked current Is and the rotation range θ into the formula [A].

$$\theta a = \{(Ia - Is)/(Ia1 - Is)\} \cdot \theta \qquad [A]$$

Thus, the formula [A] can be learned and set. After S9, the learning process is ended.

(Calculation of the Operation Angle θ)

Figure 5B:
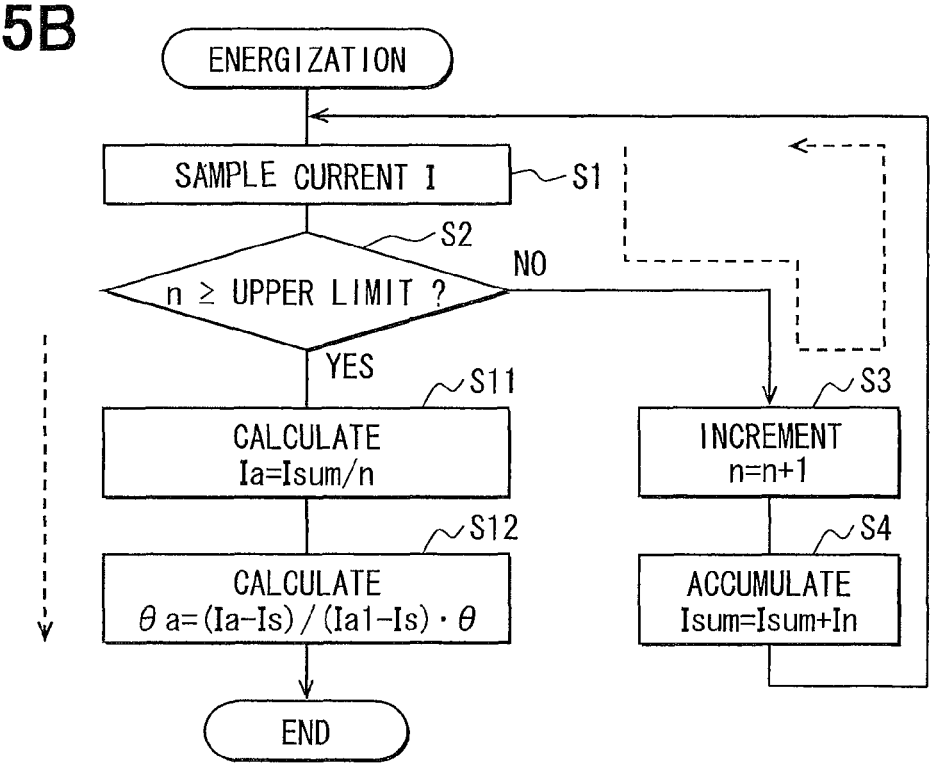
FIG. 5B is a flow chart of a calculation process according to the first embodiment.

A calculation process for calculating the operation angle θ is described below with reference to FIG. 5B. The ECU 6 performs the calculation process in accordance with the angle detection program. In the calculation process shown in FIG. 5B, the ECU 6 performs S1, S2, S3, and S4 in the same manner as in the learning process shown in FIG. 5A. Thus, the sampled motor current In is continuously accumulated into the total sampled current Isum until the counter value n reaches the upper limit equivalent to the total energization time T1. Then, when the counter value n reaches the upper limit corresponding to YES at S2, the calculation process proceeds to S11, where the ECU 6 calculates the average motor current Ia by dividing the total sampled current Isum by the counter value n.

Then, the calculation process proceeds to S12, where the ECU 6 calculates the operation angle θ by substituting the average motor current Ia, calculated at S11, into the formula [A]. After S12, the calculation process is ended.

Advantage of the First Embodiment

As described above, according to the first embodiment, the operation angle θ of the electric actuator 2 is measured from the formula [A] stored in the angle detection program by using the predetermined rotation range θ, the average motor current Ia1 measured in the initial learning process, the rotor-locked current Is measured in the initial learning process, and the average motor current Ia measured when the operation angle θ is measured.

A dependency of the formula [A] used in the first embodiment on the rotor-locked current Is is smaller than a dependency of the formula [B] used in the conventional technique on the rotor-locked current Is.

Specifically, in FIG. 4A, although a lower point (Is, 0) is dependent on the rotor-locked current Ia, an upper point (Ia1, Na) is a stable value independent of the rotor-locked current Ia.

Therefore, the angle detector according to the first embodiment less depends on the rotor-locked current Is Thus, the operation angle θa can be accurately measured.

Further, according to the first embodiment, the mechanical rotation limitation of the electric actuator 2 is provided by the mechanical stopper 14 including the stopper projection 14a and the fixed stopper 14b. Thus, the initial leaning of the angle detector can be performed without mounting the electric actuator 2 to a target (e.g., the shaft 5 of the TCV) driven by the electric actuator 2.

Further, according to the first embodiment, when the valve 3 is driven by the electric actuator 2, the ECU 6 can determine whether a failure occurs in a driving system of the valve 3 and the shaft 5 based on the operation angle θa measured by the angle detector. Thus, the reliability of the TCV can be maintained. Further, since the angle detector does not use a rotation angle sensor, an increase in the cost of the TCV can be reduced as much as, possible.

Second Embodiment

A second embodiment of the present disclosure is described below with reference to FIGS. 6A, 6B, 7A, and 7B. A difference between the first embodiment and the second embodiment is as follows.

Figure 3:
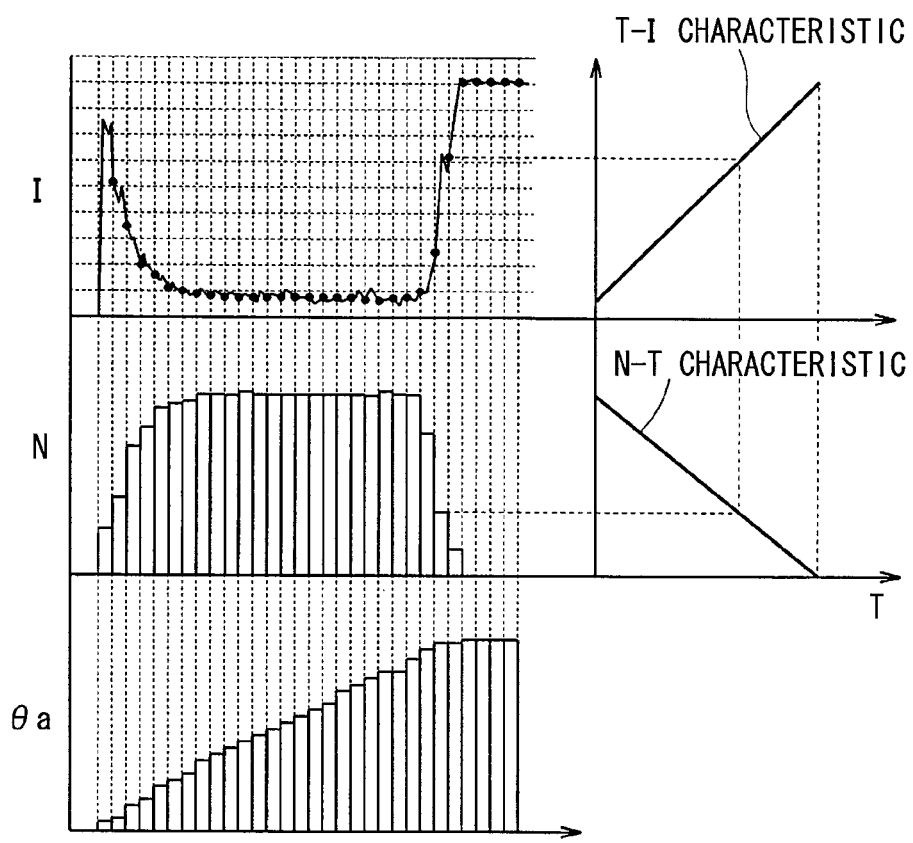
FIG. 3 is a diagram illustrating characteristics of an electric motor.

In FIG. 6A, L1 represents a time period from when an operation voltage is applied to the electric motor 1 so that the electric motor 1 can be energized to when the electric actuator 2 starts to rotate, and L2 represents a time period from when the stopper projection 14a comes into contact with the fixed stopper 14b to when the motor current I increases to the rotor-locked current Is During each of the time periods L1 and L2, the electric motor 1 does not rotate regardless of its N-I characteristic (refer to FIG. 3).

Therefore, as shown in FIG. 6A, if the average motor current Ia is calculated based on the sampled motor current In which is sampled during the time period L1 or L2, an estimated amount X of operation of the electric actuator 2 estimated from the sampled motor current In becomes different from a real amount Y of operation of the electric actuator 2. As a result, the measured operation angle θ of the electric actuator 2 can have an error. In FIG. 6A, M represents an amount (i.e., operation angle θ) of operation of the electric actuator 2, the estimated operation amount X is indicated by a solid line, and the real operation amount Y is indicated by a broken line.

To overcome the above disadvantage, according to the second embodiment, when one of the following two conditions (i) and (ii) is satisfied, the rotor-locked current Is instead of the sampled motor current In is, added to the total sampled current Isum. The first condition (i) is that when a derivation dI/dt of the motor current I equal to or greater than a first threshold value during the operation of the electric actuator 2 (i.e., during the energization of the electric motor 1). Z in FIG. 6B represents the first threshold value. The second condition (ii) is that a value $In-In_{-1}$, which is calculated by subtracting a previous sampled motor current $In_{-1}$ from the present sampled motor current In, is equal to or greater than a second threshold value during the operation of the electric actuator 2 (i.e., during the energization of the electric motor 1). The previous sampled motor current $In_{-1}$ is sampled immediately before the present sampled motor current In is sampled. Each of the first and second threshold values is set so that a sharp increase in the motor current I can be detected.

Figure 7A:
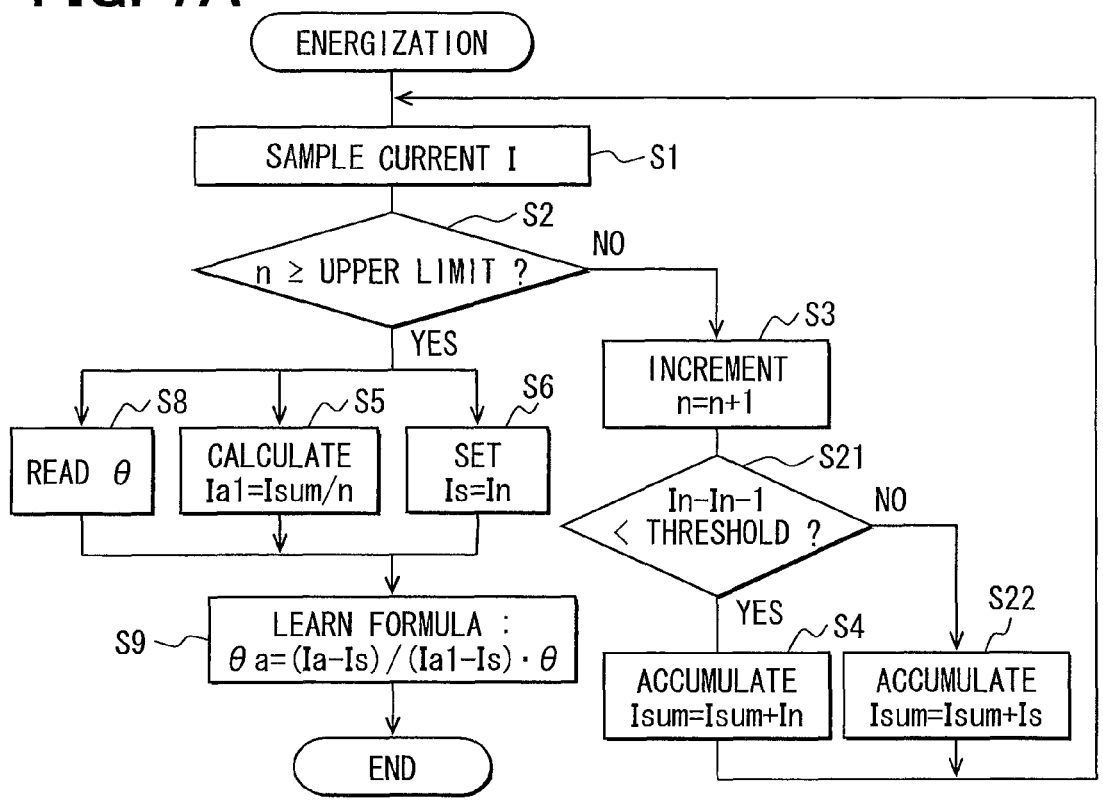
FIG. 7A is a flow chart of an initial learning process according to the second embodiment.
Figure 7B:
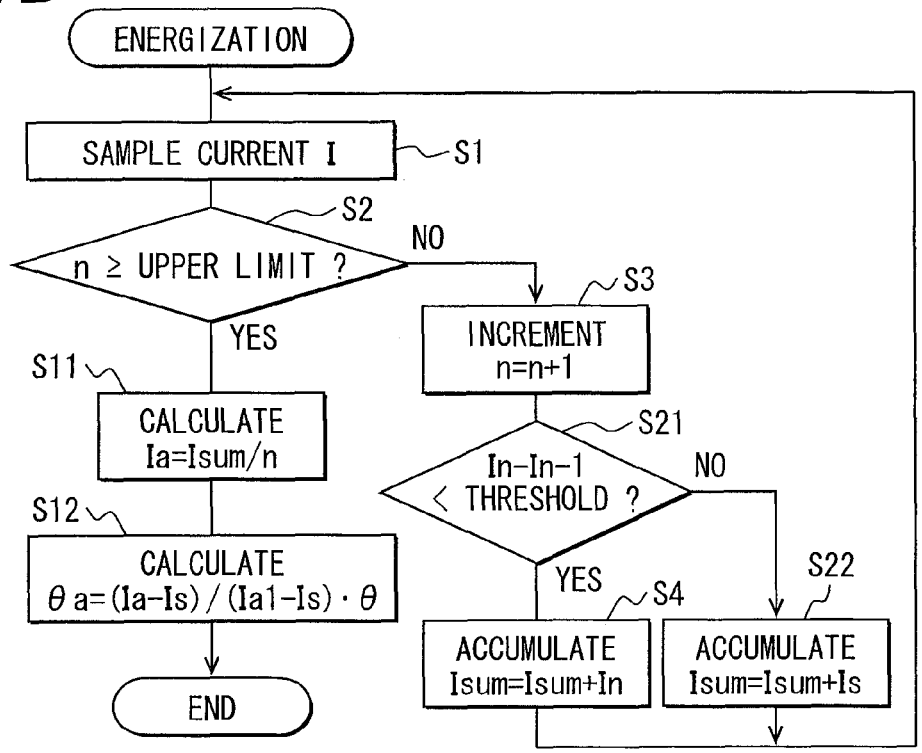
FIG. 7B is a flow chart of a calculation process according to the second embodiment.

An initial learning process for learning and setting the formula [A] and a calculation process for calculating the operation angle θ according to the second embodiment are described below with reference to FIGS. 7A and 7B, respectively. It is noted that only differences in the initial learning process and the calculation process between the first embodiment and the second embodiment are described.

After S3, each of the initial learning process and the calculation process proceeds to S21. At S21, it is determined whether a value $In-In_{-1}$, which is calculated by subtracting the previous sampled motor current $In_{-1}$ from the present sampled motor current In, is less than a predetermined threshold value.

If the value $In-In_{-1}$ is equal to or greater than the threshold value corresponding to NO at S21, each of the initial learning process and the calculation process proceeds to S22. At S22, the rotor-locked current Is instead of the sampled motor current In is added to the total sampled current Isum. After S22, each of the initial learning process and the calculation process returns to S1.

In contrast, if the value $In-In_{-1}$ is less than the threshold value corresponding to YES at S21, each of the initial learning process and the calculation process proceeds to S4. At S4, the sampled motor current In is added to the total sampled current Isum. After S4, each of the initial learning process and the calculation process returns to S1.

Advantage of the Second Embodiment

As described above, according to the second embodiment, when the derivation dI/dt or the subtracted value $In-In_{-1}$ is equal to or greater than the corresponding threshold value, the rotor-locked current Is instead of the sampled motor current In is added to the total sampled current Isum, from which the average motor current Ia is calculated.

Thus, the average motor current Ia is calculated based the premise that the electric motor 1 does not rotate (i.e., the motor rotation number N=0) during each of the time periods L1 and L2.

In such an approach, components causing the error are eliminated. Therefore, as shown in FIG. 6B, the estimated operation amount X, which is calculated from the formula [A] and the average motor current Ia, becomes almost equal to the real operation amount Y. That is, the operation angle θ can be accurately measured.

Supplemental Explanation of the Second Embodiment

The electric motor 1 can stop rotating regardless of the mechanical stopper 14. In this case, the average motor current Ia can be calculated based the premise that the electric motor 1 does not rotate during the time period L1.

The advantage of the second embodiment is obtained, when the electric motor 1 is energized by applying the operation voltage to the electric motor 1 at a time That is, the advantage of the second embodiment is not obtained, when the electric motor 1 is energized by gradually increasing the operation voltage applied to the electric motor 1. Likewise, the advantage of the second embodiment is not obtained, when the electric motor 1 is stopped so that a sharp change in the motor current I does not occur, for example, by reducing the operation voltage applied to the electric motor 1 before the stopper projection 14a comes into contact with the fixed stopper 14b.

Modification of the First and Second Embodiments

The operation angle θ can be calculated from the formula (9) instead of the formula [A].

The electric actuator 2 can have a reducer other than the gear reducer 7. For example, the electric actuator can have a pulley reducer. Alternatively, the electric actuator 2 can have no reducer.

The mechanical rotation limitation of the electric actuator 2 can be limited by a member other than the mechanical stopper 14.

It is not always necessary that the current sensor 15 includes all of the shunt resistor 15a, the filter circuit 15b, and the amplifier circuit 15c.

The operation angle θ can be calculated by a device other than the CPU 12.

The operation amount calculated based on the current flowing through the electric motor 1 is not limited to the amount of operation (i.e., operation angle θ) of the electric actuator 2. For example, the operation amount can be an amount of operation of the electric motor 1 or an amount of operation of a target driven by the electric actuator 2 through a transmission such as a linking device.

The target driven by the electric actuator 2 is not limited to the TCV. For example, the target can be a swirl control valve.

The sampling interval Δt can be adjusted as needed. For example, the operation amount can be measured more accurately by reducing the sampling interval Δt.

Third Embodiment

An angle detector according to a third embodiment of the present disclosure is described below with reference to FIGS. 8A, 8B, 9, and 10. The third embodiment is similar to the second embodiment.

Figure 8A:
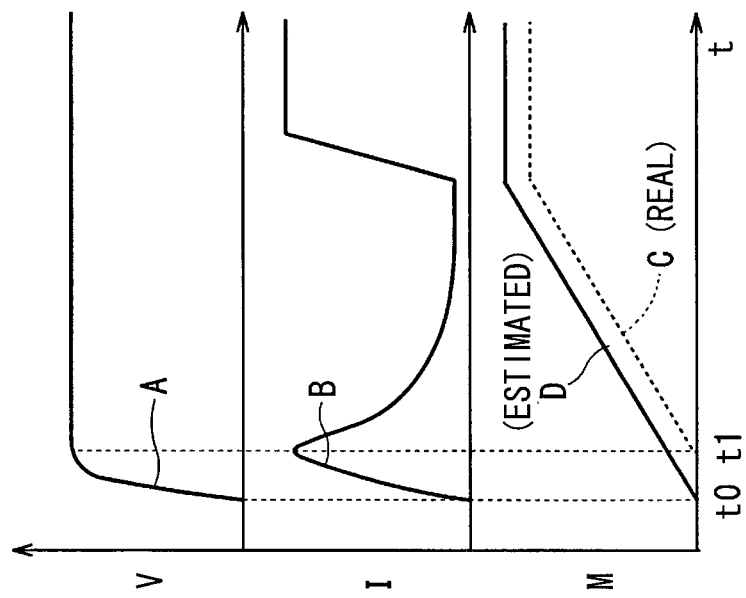
FIG. 8A is a timing chart according to a prior art.

Assuming that the electric motor 1 is driven by turning ON and OFF a switch such as a MOSFET or a relay, an inrush current (i.e., transient current) occurs in the electric motor 1 (refer to a solid line B in FIG. 8A) after the electric motor 1 is energized until a voltage reaches a stable value (refer to a solid line A in FIG. 8A).

The electric motor 1 remains stopped for a short time immediately after the inrush current occurs. That is, as indicated by a broken line C in FIG. 8A, a real amount of operation of the electric actuator 2 starts to increase at a time t1 when the electric motor 1 starts to rotate, not at a time t0 when the electric motor 1 is energized.

Therefore, if the amount of operation of the electric actuator 2 is estimated (i.e., calculated) based on the motor current I sampled during a time period from the time t0 to the time t1, the estimated amount of operation of the electric actuator 2 becomes different from the real amount of operation of the electric actuator 2. That is, the estimated amount of operation of the electric actuator 2 has a measurement error. In FIG. 8A, M represents the amount of operation (i.e., operation angle .theta.) of the electric actuator 2, and a solid line D represents the estimated amount of operation of the electric actuator 2.

The angle detector according to the third embodiment is configured to cancel the measurement error. The angle detector includes a current sensor 22 and a controller 23. The current sensor 22 detects the motor current I flowing through the electric motor 1. According to the first embodiment, the current sensor 22 includes a shunt resistor 22a, a filter circuit 22b, and an amplifier circuit 22c. The shunt resistor 22a is connected between the driver circuit 13 and a ground potential. The filter circuit 22b removes noise from a voltage signal detected by the shunt resistor 22a. The amplifier circuit 22c amplifies an output signal of the filter circuit 22b. An output signal of the amplifier circuit 22c is converted to a digital signal and read by the controller 23.

The controller 23 calculates an operation amount based on the motor current I. The operation amount is at least one of an amount of operation of the electric motor 1, an amount of operation of the electric actuator 2, and an amount of operation of a target driven by the electric actuator 2. According to the third embodiment, the controller 23 calculates the amount of operation (i.e., operation angle θ) of the electric actuator 2 based on the motor current I.

The controller 23 has an inrush current detecting function of detecting a change in the inrush current from an increase to a decrease. For example, the controller 23 can compare the present sampled motor current In with the previous sampled motor current $In_{-1}$. In this case, the controller 23 detects the change in the inrush current from the increase to the decrease, when the present sampled motor current In becomes smaller than the previous sampled motor current $In_{-1}$. Alternatively, the controller 23 can calculate a derivation (dI/dt) of the motor current I with respect to time. In this case, the controller 23 detects the change in the inrush current from the increase to the decrease, when the derivation (dI/dt) changes from positive to negative.

Thus, according to the third embodiment, the controller 23 starts to calculate the operation amount based on the motor current I after the increasing inrush current starts to decrease.

The electric actuator 2 is mounted on the vehicle and drives a target such as the TCV described in the preceding embodiments. The electric actuator 2 includes the electric motor 1 and a reducer for decelerating rotation of the electric motor 1 (i.e., for increasing the torque of the electric motor 1).

The electric motor 1 is a DC motor such as a brushed DC. When a direction of energization to the electric motor 1 changes, a rotation direction of the electric motor 1 changes.

For example, the reducer can be a gear reducer such as the gear reducer 7 described in the preceding embodiments. Alternatively, the gear reducer can be a pulley reducer.

The electric motor 1 is driven by the driver circuit 13. That is, the driver circuit 13 energizes and de-energizes the electric motor 1. When the driver circuit 13 starts to energize the electric motor 1, the inrush current occurs in the electric motor 1.

The controller 23 can be an ECU mounted in the vehicle. The controller 23 includes a central processing unit (CPU) and has an operation angle monitoring function of calculating the operation angle θ of the electric actuator 2 based on the motor current I. According to the third embodiment, the operation angle monitoring function is achieved by software (i.e., program). That is, the controller 23 has an operation angle monitoring program for achieving the operation angle monitoring function.

The operation angle monitoring program includes an error canceling program and an angle calculation program. The error canceling program is used to cancel the measurement error caused by the time period from the time t0 to the time t1. The angle calculation program is used to calculate the operation angle θa based on the average motor current Ia.

Specifically, the error canceling program prohibits the controller 23 from measuring the motor current I after the electric motor 1 is energized until the increasing inrush current starts to decrease. According to the third embodiment, the controller 23 compares the present sampled motor current In with the previous sampled motor current $In_{-1}$. Then, when the present sampled motor current In becomes smaller than the previous sampled motor current $In_{-1}$, the controller 23 determines that the increasing inrush current starts to decrease.

The angle calculation program calculates the operation angle θ from the formula (9) by using the average motor current Ia, which is an average of the motor current I flowing through the electric motor 1 during a predetermined energization measurement time.

$$θa=(k·Ia+g)·(T1/r) \qquad (9)$$

The formula (9) can be derived in the same manner as described in the first embodiment (Calculation of the Operation Angle θ)

Figure 10:
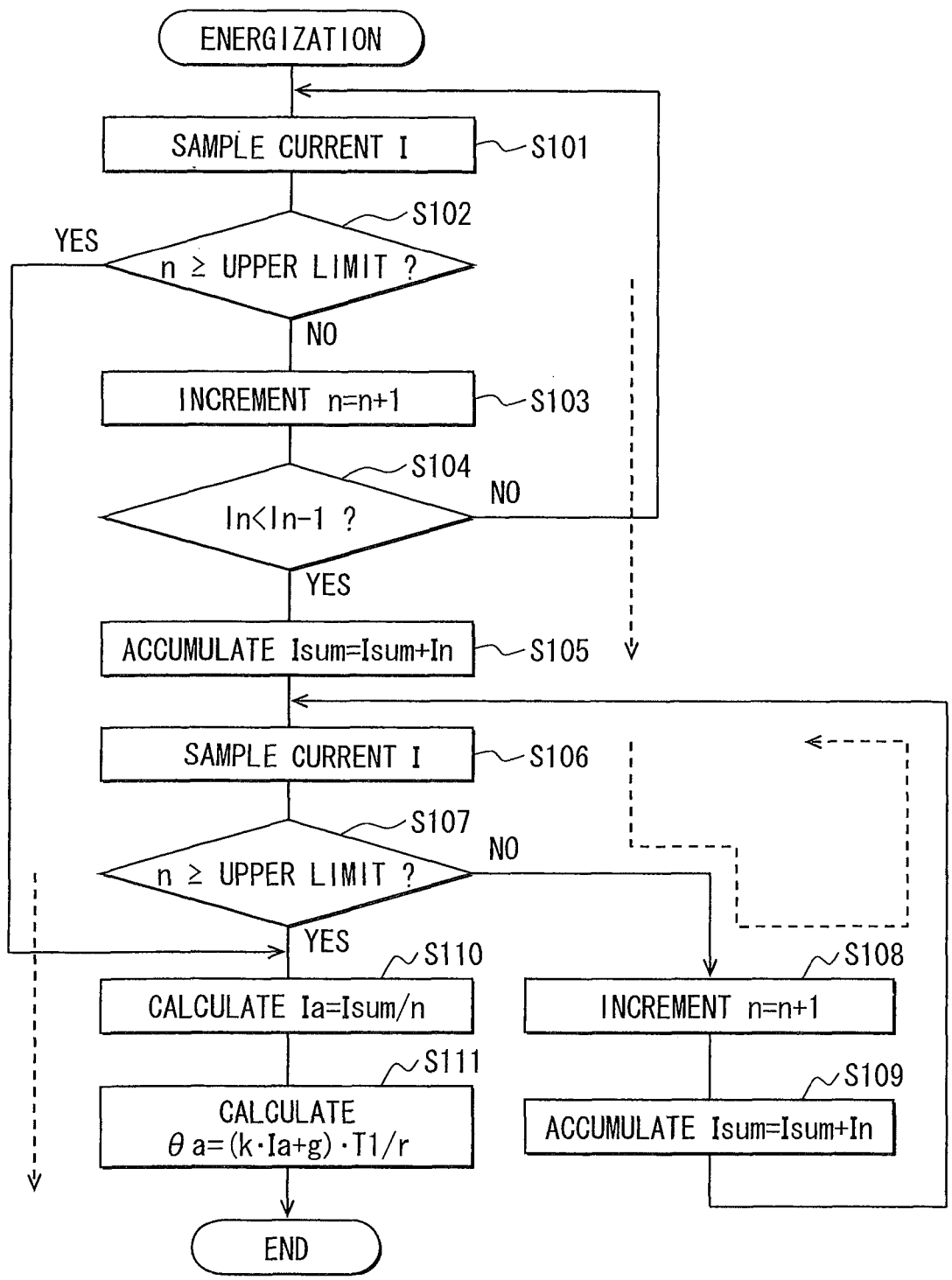
FIG. 10 is a flow chart of an operation angle monitoring process according to the third embodiment.

An operation angle monitoring process for calculating the operation angle θ by canceling the measurement error is described below with reference to FIG. 10. To measure the operation angle θ, the controller 23 performs the operation angle monitoring process in accordance with the operation angle monitoring program. The operation angle monitoring process starts at S101, where the controller 23 obtains the sampled motor current In by sampling the motor current I. Then, the operation angle monitoring process proceeds to S102, where the controller 23 determines whether a counter value n reaches a predetermined upper limit equivalent to the energization measurement time.

If the counter value n reaches the upper limit corresponding to YES at S102, the operation angle monitoring process jumps to S110. In contrast, if the counter value n does not reach the upper limit corresponding to NO at S102, the operation angle monitoring process proceeds to S103. At S103, the controller 23 increments the counter value n by one. Then, the operation angle monitoring process proceeds to S104, where the controller 23 determines whether the present sampled motor current In is less than the previous sampled motor current $In_{-1}$ If the present sampled motor current In is equal to or greater than the previous sampled motor current $In_{-1}$ corresponding to NO at S104, the controller 23 determines that the inrush current is still increasing, and the operation angle monitoring process returns to S101.

In contrast, if the present sampled motor current In is less than the previous sampled motor current $In_{-1}$ corresponding to YES at S104, the controller 23 determines that the increasing inrush current starts to decrease, and the operation angle monitoring process proceeds to S105.

At S105, the controller 23 calculates a total sampled current Isum by accumulating the sampled motor current In.

Then, the operation angle monitoring process proceeds to S106, where the controller 23 obtains the sampled motor current In by sampling the motor current I. Then, the operation angle monitoring process proceeds to S107, where the controller 23 determines whether the counter value n reaches the upper limit equivalent to the energization measurement time.

If the counter value n does not reach the upper limit corresponding to NO at S107, the operation angle monitoring process proceeds to S108. At S108, the controller 23 increments the counter value n by one. Then, the operation angle monitoring process proceeds to S109, where the controller 23 calculates the total sampled current Isum by accumulating the sampled motor current In. Then, the operation angle monitoring process returns to S106.

In contrast, if the counter value n reaches the upper limit corresponding to YES at S107, the operation angle monitoring process proceeds to S110. At S110, the controller 23 calculates the average motor current Ia by dividing the total sampled current Isum by the counter value n.

Then, the operation angle monitoring process proceeds to S111, where the controller 23 calculates the operation angle θ by substituting the average motor current Ia, calculated at S110, into the formula (9). After S111, the operation angle monitoring process is ended.

Advantage of the Third Embodiment

Figure 8B:
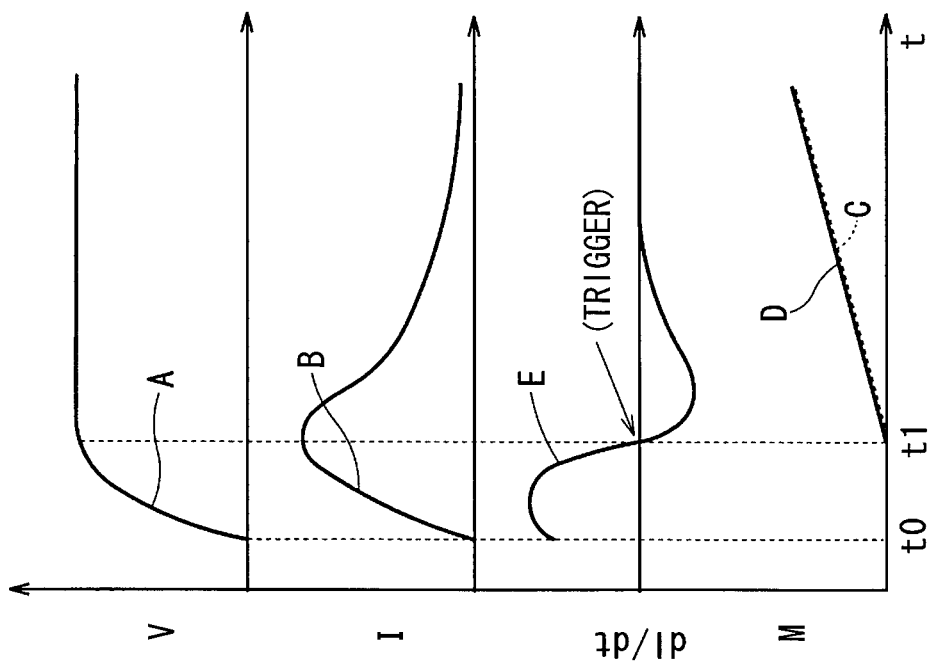
FIG. 8B is a timing chart according to a third embodiment of the present disclosure.
Figure 9:
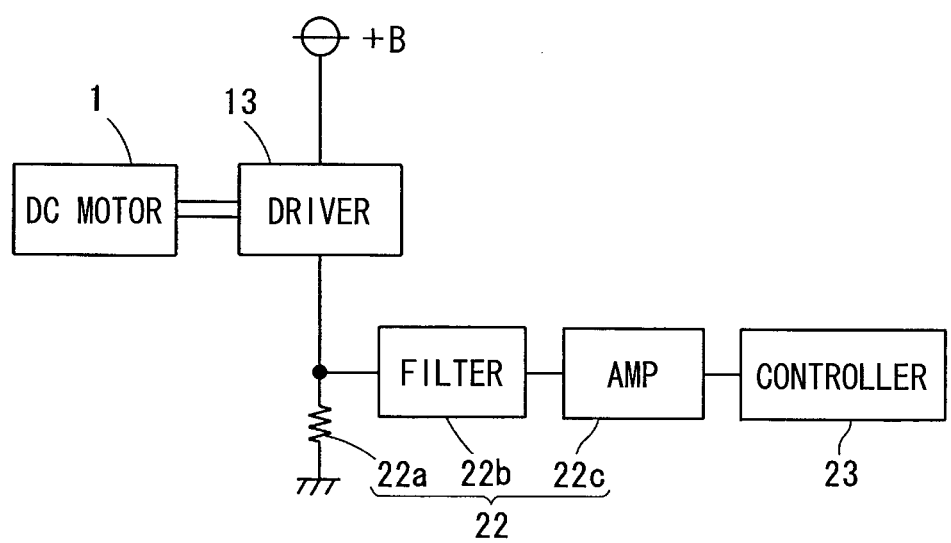
FIG. 9 is a block diagram of an angle detector according to the third embodiment.

As described above, according to the third embodiment, the controller 23 starts to calculate the operation amount based on the motor current I after the increasing inrush current starts to decrease. Thus, as indicated by a solid line D in FIG. 8B, the controller 23 can estimate the operation amount based on the motor current I obtained after the time t1, not the time t0. Therefore, as shown in FIG. 8B, the estimated operation amount, indicated by the solid line D, becomes almost equal to a real operation amount, indicated by a broken line C.

In this way, the measurement error, caused by the time period from the time t0 to the time t1 when the inrush current is increasing, can be removed. Thus, the operation amount (i.e., operation angle θ) of the electric actuator 2 can be accurately measured.

Further, according to the third embodiment, the controller 23 detects the change in the inrush current from an increase to a decrease simply by comparing the present sampled motor current In with the previous sampled motor current $In_{-1}$. Thus, processing load on the controller 23 can be reduced.

Further, according to the third embodiment, the controller 23 calculates the operation amount based on the average motor current Ia, which is the average of the motor current I during the energization measurement time. In such an approach, the calculated operation amount less depends on the rotor-locked current Is.

Modification of the Third Embodiment

As indicated by a solid line E in FIG. 8B, the controller 23 can detect the change in the inrush current from the increase to the decrease by detecting a change (i.e., trigger point in FIG. 8) in a derivation (dI/dt) of the motor current I with respect to time from positive to negative.

The operation amount calculated based on the current flowing through the electric motor 1 is not limited to the amount of operation (i.e., operation angle θ) of the electric actuator 2. For example, the operation amount can be an amount of operation of the electric motor 1 or an amount of operation of a target driven by the electric actuator 2 through a transmission such as a linking device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An angle detector for detecting an operation angle of an electric actuator having an electric motor, the electric motor configured to generate rotation force when being energized, the angle detector comprising:
   a controller, including a computer processor, the controller being at least configured to:
      sample a motor current flowing through the electric motor during operation of the electric actuator;
      calculate a first average current flowing through the electric motor during operation of the electric actuator; and
      calculate the operation angle of the electric actuator from a predetermined formula by using the average current; and
   a mechanical stopper attached to the electric actuator to provide a mechanical rotational limitation of the electric actuator; wherein
   except when a first condition or a second condition is satisfied, the controller calculates the first average current by using the sampled motor current flowing through the electric motor during operation of the electric actuator and by accumulating the sampled motor current,
   the first condition is satisfied when a derivation of the motor current with respect to time is equal to or greater than a first threshold value,
   the second condition is satisfied when a value, which is calculated by subtracting a previous sampled motor current from a present sampled motor current, is equal to or greater than a second threshold value,
   when the first condition or the second condition is satisfied, the controller calculates the first average current by adding a rotor-locked current instead of the sampled motor current, and
   the rotor-locked current flows though the electric motor when the electric actuator abuts on the mechanical stopper and cannot mechanically operate.

2. The angle detector according to claim 1, wherein the formula is given by:

$$\theta a=\{(Ia-Is)/(Ia1-Is)\}\cdot\theta$$

θa represents the operation angle,

θ represents a rotation range of the electric actuator determined by a mechanical rotational limitation, Ia represents the first average current, Ia1 represents a second average current flowing through the electric motor during a total energization time when the electric actuator operates from one end of the rotation range to the other end of the rotation range, and Is represents a rotor-locked current flowing though the electric motor when the electric actuator cannot mechanically operate.

3. The angle detector according to claim 1, wherein the electric actuator includes a gear reducer for decelerating an output of the electric motor, the gear reducer includes a final gear for transmitting the decelerated output to a target driven by the electric actuator, and the mechanical stopper mechanically limits a rotation of the final gear to provide the mechanical rotational limitation of the electric actuator.

4. An angle detector for detecting an operation amount based on a motor current flowing through an electric motor, the electric motor configured to generate rotation force when being energized, the operation amount indicating at least one of an amount of operation of the electric motor, an amount of operation of an electric actuator having the electric motor, and an amount of operation of a target driven by the electric actuator, the angle detector comprising:

a controller being at least configured to:

detect a change in an inrush current from an increase to a decrease; and calculate the operation amount based on the motor current that is generated when the inrush current starts decreasing and when the motor starts to rotate, wherein the inrush current is the motor current occurring immediately after the electric motor is energized.

5. The angle detector according to claim 4, wherein the controller measures the inrush current, and the controller detects the change in the inrush current from the increase to the decrease when the presently measured inrush current becomes smaller than the immediate previously measured inrush current.

6. The angle detector according to claim 4, wherein the controller calculates a derivation of the motor current with respect to time, and the controller detects the change in the inrush current from the increase to the decrease when the derivation changes from positive to negative.

7. The angle detector according to claim 4, wherein the controller calculates the operation amount based on an average of the motor current during a predetermined energization measurement time.

8. The angle detector according to claim 4, wherein the controller calculates the operation amount based on the motor current after the motor starts to rotate so that the change in the inrush current from the increase to the decrease is detected, without being based on the motor current during a period of time from a start of energization of the motor to a start of rotation of the motor.

9. An apparatus comprising:

a controller, including a computer processor, the controller being at least configured to:

calculate a first average current flowing through an electric motor of an electric actuator during operation of the electric actuator;

calculate the operation angle of the electric actuator from a predetermined formula by using the average current;

determine a failure associated with the apparatus based on the operation angle; and control the electric motor; and a mechanical stopper attached to the electric actuator to provide a mechanical rotational limitation of the electric actuator, wherein:

except when a first condition or a second condition is satisfied, the controller calculates the first average current by sampling a motor current flowing through the electric motor during operation of the electric actuator and by accumulating the sampled motor current;

the first condition is satisfied when a derivation of the motor current with respect to time is equal to or greater than a first threshold value;

the second condition is satisfied when a value, which is calculated by subtracting a previous sampled motor current from a present sampled motor current, is equal to or greater than a second threshold value;

when the first condition or the second condition is satisfied, the controller calculates the first average current by adding a rotor-locked current instead of the sampled motor current: and the rotor-locked current flows though the electric motor when the electric actuator abuts on the mechanical stopper and cannot mechanically operate.

10. The apparatus according to claim 9, wherein the formula is given by:

$$\theta a=\{(Ia-Is)/(Ia1-Is)\}\cdot\theta$$

θa represents the operation angle,

θ represents a rotation range of the electric actuator determined by a mechanical rotational limitation, Ia represents the first average current, Ia1 represents a second average current flowing through the electric motor during a total energization time when the electric actuator operates from one end of the rotation range to the other end of the rotation range, and Is represents a rotor-locked current flowing though the electric motor when the electric actuator cannot mechanically operate.

11. The apparatus according to claim 9, wherein:

the apparatus further comprises the electric actuator including a gear reducer for decelerating an output of the electric motor, the gear reducer includes a final gear for transmitting the decelerated output to a target driven by the electric actuator, and the mechanical stopper mechanically limits a rotation of the final gear to provide the mechanical rotational limitation of the electric actuator.

12. The angle detector according to claim 1, further comprising a current sensor for detecting the motor current flowing through the electric motor.

13. The angle detector according to claim 4, further comprising a current sensor for detecting the motor current flowing through the electric motor.

14. The apparatus according to claim 9, further comprising a current sensor for detecting the motor current flowing through the electric motor.

15. The angle detector according to claim 4, wherein the controller is configured to detect the change in the inrush current from the increase to the decrease by comparing a present sampled motor current with a previously sample motor current.

* * * * *